E. J. LEES.
POSITIVELY OPENING CHUCK.
APPLICATION FILED MAY 12, 1915.
1,169,547.
Patented Jan. 25, 1916.
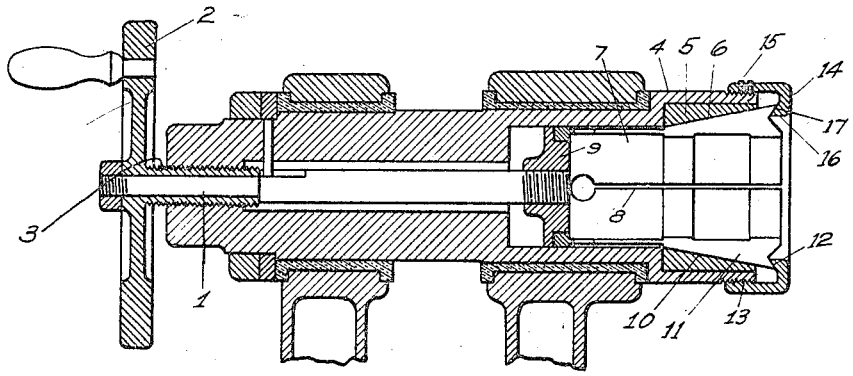
Fig. I.
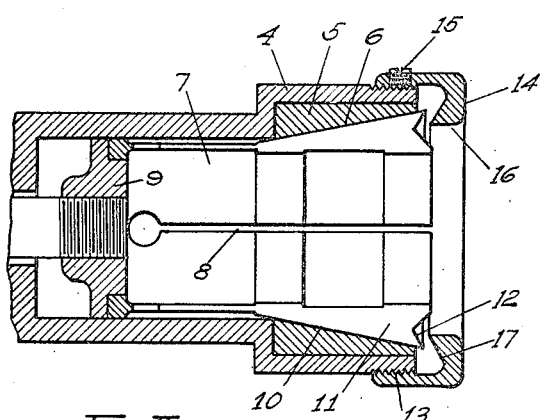
Fig. II.
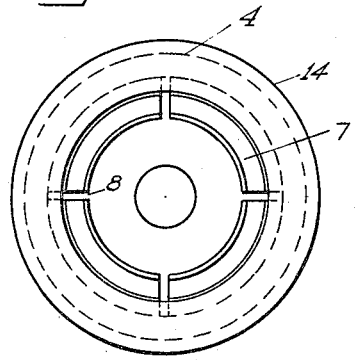
Fig. IV.
Fig. V.
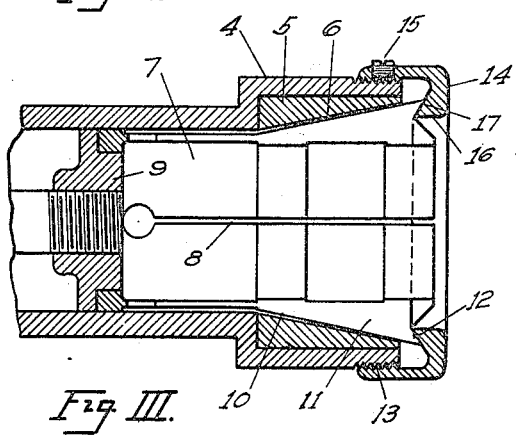
Fig. III.
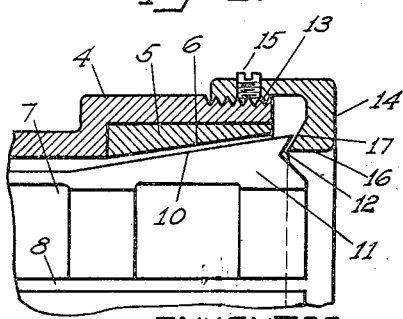
INVENTOR
Ernest J. Lees
BY

UNITED STATES PATENT OFFICE.

ERNEST J. LEES, OF CLEVELAND, OHIO, ASSIGNOR TO THE LEES-BRADNER CO., OF CLEVELAND, OHIO.

POSITIVELY-OPENING CHUCK.

1,169,547. Specification of Letters Patent. Patented Jan. 25, 1916.

Application filed May 12, 1915. Serial No. 27,627.

*To all whom it may concern:*

Be it known that I, ERNEST J. LEES, a citizen of the United States, residing at the city of Cleveland, in the county of Cuyahoga and State of Ohio, have invented a new and useful Improvement in a Positively-Opening Chuck, of which the following is a specification, the principle of the invention being herein explained and the best mode in which I have contemplated applying that principle, so as to distinguish it from other inventions.

This invention entitled a positively opening chuck is associated more particularly with a machine implement of this character in which a plurality of clamping jaw sections may be positively expanded as well as constricted. The selected example shows a collet having jaws which are additionally subject to their own tempered spring action.

Heretofore, so far as my knowledge extends, while the member or housing which confined the chuck block or collet could always be relied upon to cause the constriction of the latter, no consistent or lasting satisfaction could be expected in the matter of release or expansion of the jaws. This circumstance was owing to the fact that the constrictive action was positive whereas the release action was not. The release frequently failed to functionate promptly, the extent to which it did became progressively less and occasionally the jaws did not spring open at all without the aid of manipulation. The responsibility for the consequent waste in time, effort and precision lay with the well known factor of metal fatigue. It was next sought to find compensation for such limited effective endurance by an increase in the spring stress, at greater cost and without escape from the excess of energy which was required to oppose the spring action during the clamping operation. Furthermore, as the possible degree of expansion grew less its excess margin with reference to some particular stock job grew similarly less with a decreased likelihood of accounting for variation or of accommodating larger sizes. When a collet is gripping a piece of stock which happens to be larger than its own bore, a wedge action against the stock results requiring a positive release therefrom.

Accordingly, one object of my invention is the provision of a chuck in which the release operation is as reliable as the clamping operation and an assurance as to this can be expected only from the positive action which my invention provides.

Another object is to afford capability of adjustment.

A chuck constructed after the manner of my invention incident to being positive as regards opening as well as closing has: a quicker action, an adjustable action, a uniform action, a timed action, a greater range of action, a more responsive action.

I would have it expressly understood that I in no wise limit myself to this specific application or embodiment of my invention, which I have selected as a basis for illustrating and describing my invention merely for the purpose of rendering a clear and comprehensive understanding of the scope and novel features thereof.

Adverting to the drawing: Figure I is a longitudinal section of a chuck embodying my invention, the same being shown feasibly supported. Fig. II is an enlarged longitudinal section of the chuck showing the parts in a given relative position. Fig. III is a similar view with certain parts in an altered position. Fig. IV is a correspondingly enlarged end view. Fig. V is a still further enlarged and broken view of about one-half showing the parts in neutral position.

An inspection of Fig. I discloses a spindle 1 suitably mounted in any approved manner, which, since it forms no part of the invention, need not be specifically described. A hand wheel 2 is operatively mounted upon the spindle 1 by means of its threaded hub 3 which, for a purpose to be later expressed, may be assumed as six threads to one inch. The outer wall of a tail piece 4 carries interiorly a head 5 the inner surface 6 thereof being of conical contour for a given distance from its extremity.

A case hardened internally and exteriorly ground chuck block 7 is fashioned with quadrantly spaced slots 8 whereby the desired spring properties or flexibility may be obtained. This block is connected at 9 with the proximate end of the spindle 1. The outward surfaces 10 of the four clamping-jaw sections 11 are inversely beveled as the head surface 6 being of complementary tapered contour and adapted to be caused to approach or recede therefrom. Obviously, a recessional movement on the part of the spindle 1 in response to a withdrawing turn upon the hand wheel 2 tends to cause the jaws 11 to bear against surface 6 and to become forced to constriction. The extremities of the jaws 11 are additionally formed as axially inclined surfaces 12 and purposely of greater angularity than the surfaces 10.

In threaded connection at 13 about the extremity of the wall 4 is a peculiarly shaped abutment ring 14. The adjustment and fixing of this ring in some particular position may be accomplished in the usual manner by a set screw 15. This is important as will later appear. The ring 14 has an inwardly projecting flange 16 and that side of this flange which is away from the entrance to the chuck is fashioned with a surface 17 inclined at the same angle as the end surfaces 12 of the jaws. The surface 17 is positioned in the path of movement of the jaws 11 and specifically their end surfaces 12. It will be apparent therefore that when the jaws 11 are moved forwardly or in a direction out of the head a sliding contact of their surfaces 12 with the surface 17 ensues and this in turn results in the positive expansion or opening thereof. Such expansion is limited by the position shown in Fig. III and manifestly such extreme open position may be controlled at will by the adjustment of the ring 14 upon the wall 4 whereby the time the impingement occurs is determined. In this wise also a readjustment may insure uniformity of expansion for fixed variations in the case of different jobs. As a consequence of the greater angularity from the axis of the chuck of the surfaces 12 and the complementary surface 17 than is assumed and shown by the surfaces 10 and the complementary surface 6; a slight movement at the wheel 2 is accentuated at the chuck. For example, a single revolution of the wheel with threads as earlier premised effects an expansion of one-thirty-second of an inch. By this arrangement moreover a very quick and responsive release may be had and a correspondingly quickly initiated return.

My invention especially commends itself in use upon automatic machines such, for example, as automatic screw machines, where stock is rapidly fed to the chuck at regular intervals. Under such conditions the grabbing operation of the chuck should be and by means of my invention can be timed to a nicety whereby it will always open quickly, accurately, at the same time, without superfluous movement and as usually to be preferred with a slight margin of expansion beyond that required, in order to permit the insertion of unexpectedly oversized stock as well as stock having an advanced portion of larger known dimension.

I claim:

1. A positively opening chuck comprising a hollow head, a chuck block having expansible jaws and movable therein, and means associated with said head and adapted positively to expand said jaws during the outward travel of said block and to be functionless during the inward travel of said block.

2. A collet chuck comprising gripping jaws and means including a conical surface with a given inclination whereby said jaws may be positively closed by a relative movement between said jaws and said means—in one direction, and means including a distinct conical surface with a greater inclination than that of said first mentioned conical surface whereby they may be positively opened by relative movement in the opposite direction.

3. A positively opening chuck comprising a hollow head, a chuck block movable therein and carrying relatively movable jaws, and means adjustably carried by said head and adapted positively to open said jaws at different stages of the outward travel of said block.

4. A positively opening chuck comprising a hollow head fashioned interiorly with surfaces inclined toward the axis, a chuck block having expansible jaws and movable through said head, and a member carried on the forward end of said head, said member projecting into the path of forward movement of said jaws and fashioned with rearwardly presented surfaces inclined toward the axis, said jaws being fashioned with distinct surfaces likewise inclined toward the axis and adapted to engage the inclined surfaces of said head and member respectively, the engagement of one engaging pair of surfaces adapted positively to open and the other positively to close said jaws.

5. A positively opening chuck comprising a hollow head, a chuck block movable therein and provided with expansible jaws, and a member carried upon the open end of said head and provided with an inwardly projecting flange, said jaws and flange having similarly tapered and opposed surfaces inclined rearwardly toward the axis whereby to open said jaws.

6. A positively opening chuck comprising a hollow head, a plurality of expansible clamping-jaws therein, means for moving said jaws axially of said head, the forward ends of said head and jaws being fashioned with surfaces similarly inclined rearwardly whereby to positively expand said jaws when the latter are moved outwardly.

7. A positively opening chuck comprising a hollow head, a plurality of clamping-jaws compressed therein, means for moving said jaws axially of said head, an open interiorly projecting end of said head and the forward edges of said jaws being fashioned with similarly inclined surfaces adapted to abut when a predetermined extent of forward movement has been had, whereby positively to expand said jaws when the latter are moved outwardly.

8. A positively opening chuck comprising in combination with a hollow head and jaws, said jaws being capable of axial and expansible movement, of stationary means interposed in the path of one of said movements and automatically adapted positively to effect the opening of said jaws when the latter are moved axially in a given direction.

9. A positively opening chuck comprising in combination with a hollow head and jaws, said jaws being capable of concerted and relative movement, of abutment means interposed and fixed in the path of concerted movement and automatically adapted progressively to effect the relative movement to open said jaws and to determine the rapidity thereof.

10. A positively opening chuck comprising a hollow interiorly tapered head, a plurality of jaws therein having similarly tapered surfaces adapted to bear against the tapered portion of said head, said jaws being furthermore fashioned near their outward ends with tapered surfaces of greater angularity with reference to the axis of the chuck, and a ring carried by said head and provided with a tapered surface of similar contour to said last mentioned jaw surfaces, said tapered ring surface lying in the path of movement of said jaw surfaces of greater angularity, means for moving said jaws together in an axial direction, the arrangement being such that a given relative movement of said opposed head and jaw surfaces is accelerated along said opposed jaw and ring surfaces for the purpose specified.

11. A positively opening chuck comprising a hollow head, a plurality of expansible clamping-jaws therein, means for moving said jaws axially of said head, said head being fashioned near its open end with an inclined surface presented in a direction away from said open end and so as to intersect the path of movement of the extremity of one of said jaws whereby to expand said jaws when the latter are moved forwardly.

12. A chuck of the character described comprising a housing and a spring expansive collet movable longitudinally of said housing, said housing and collet each having two sets of operatively opposed inclined surfaces, the arrangement being such that each set of inclined surfaces of said collet may simultaneously assume a free position out of contact with the set of inclined surfaces of the housing irrespective of any such longitudinal movement.

13. A collet chuck comprising gripping jaws and means whereby said jaws may be positively closed by a relative movement between said jaws and said means in one direction, and means whereby they may be positively opened by relative movement in the opposite direction, said last named means being adjustable for varying the extent of the longitudinal movement, whereby the time of the opening action is determined.

14. A collet chuck comprising gripping jaws and means whereby said jaws may be positively opened by a relative movement between said jaws and said means in a longitudinal direction, said means being adjustable for varying the extent of the longitudinal movement, whereby to determine the initiation of such opening action.

15. A collet chuck comprising gripping jaws and means including a conical surface whereby said jaws may be positively closed by a relative movement between said jaws and said means in one direction, and means including a distinct conical surface whereby they may be positively opened by relative movement in the opposite direction.

16. A collet chuck comprising gripping jaws and means including a conical surface with inclination in a given direction whereby said jaws may be positively closed by a relative movement between said jaws and said means in one direction, and means including a distinct conical surface with inclination in the same general direction as that of said first mentioned conical surface whereby they may be positively opened by relative movement in the opposite direction.

17. A chuck of the character described comprising a housing, gripping jaws, a ring carried by said housing whereby said jaws may be positively opened by a relative longitudinal movement between said jaws and ring, and means for adjusting said ring for varying the extent of the longitudinal movement whereby to determine the initiation of such opening action.

18. A collet chuck comprising gripping jaws and means whereby said jaws may be positively closed by a relative movement between said jaws and means in one direction of the axis, and means including a surface oblique relative to the axis whereby said jaws may be positively opened by a sliding engagement of said jaws along said surface in the other direction of such axis, one of said means being adjustable for varying the extent of such axial movement in one direction whereby to time one of said actions.

Signed by me, this fourth day of May, 1915.

ERNEST J. LEES.